US006957128B1

(12) United States Patent
Ito et al.

(10) Patent No.: US 6,957,128 B1
(45) Date of Patent: Oct. 18, 2005

(54) VEHICLE INFORMATION PROCESSING METHOD, APPARATUS THEREFOR AND VEHICLE THEREWITH

(75) Inventors: Hajime Ito, Shizuoka-ken (JP); Masuo Sugiura, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 626 days.

(21) Appl. No.: 09/699,371

(22) Filed: Oct. 31, 2000

(30) Foreign Application Priority Data

Nov. 12, 1999 (JP) .............................. P 11-323136

(51) Int. Cl.$^7$ ............................ G05D 1/00; G05D 3/00

(52) U.S. Cl. ......................... 701/1; 701/36; 340/853.2; 340/870.16; 340/425.5; 340/500

(58) Field of Search .............................. 701/1, 36, 200; 340/853.2, 870.16, 901, 945, 984, 988, 425.5, 340/500

(56) References Cited

U.S. PATENT DOCUMENTS

| | | | | |
|---|---|---|---|---|
| 4,027,289 | A * | 5/1977 | Toman | 340/947 |
| 5,513,110 | A * | 4/1996 | Fujita et al. | 340/990 |
| 5,684,704 | A * | 11/1997 | Okazaki | 701/201 |
| 5,784,059 | A * | 7/1998 | Morimoto et al. | 340/995 |
| 5,884,202 | A * | 3/1999 | Arjomand | 701/29 |
| 6,092,006 | A * | 7/2000 | Dominke et al. | 370/539 |
| 6,154,688 | A * | 11/2000 | Dominke et al. | 701/1 |
| 6,208,932 | B1 * | 3/2001 | Ohmura et al. | 340/988 |
| 6,253,064 | B1 * | 6/2001 | Monroe | 455/430 |
| 6,256,557 | B1 * | 7/2001 | Avila et al. | 701/1 |
| 6,285,924 | B1 * | 9/2001 | Okamoto et al. | 701/1 |
| 6,389,332 | B1 * | 5/2002 | Hess et al. | 701/1 |
| 2001/0012976 | A1 * | 8/2001 | Menig et al. | 701/1 |
| 2002/0120371 | A1 * | 8/2002 | Leivian et al. | 701/1 |

* cited by examiner

*Primary Examiner*—Olga Hernandez
(74) *Attorney, Agent, or Firm*—Finnegan, Henderson, Farabow, Garrett & Dunner, L.L.P.

(57) ABSTRACT

For example, if multiple pieces of information arrive at and/or are generated in a vehicle at the same time, MMS optimizes selection of information to be communicated, selection of information communicating means, selection of information communication style and selection of various parameters such as communication timing, according to priority order given integrally to the multiple pieces of information, so as to communicate the multiple pieces of information to a vehicle driver effectively. Further, it communicates information effectively using appropriate resources corresponding to a parameter selected by this optimization.

19 Claims, 6 Drawing Sheets

VEHICLE INFORMATION PROCESSING METHOD, APPARATUS THEREFOR AND VEHICLE THEREWITH

BACKGROUND OF THE INVENTION

1. Field of the Invention

The present invention relates to a vehicle information processing method for use upon processing various kinds of information including a message arriving at vehicle and/or a message generated therein, an apparatus therefor and vehicle therewith, and more particularly to a vehicle information processing method capable of making effective use of appropriate information by effective resource allocation according to priority order given integrally to each information in viewpoint of importance even if arrival and/or generation of multiple pieces of information rises at the same time, an apparatus therefor and vehicle therewith.

2. Description of the Related Art

In recent years, public attention has been paid to intelligent transport systems (ITS) in which human being and automobile are integrated as a combined system using leading information communication technology and the like in order to contribute to improvement of safety, transportation efficiency and comfort of road traffic.

This ITS system is a general term including multiple systems such as road traffic information communication system called vehicle information and communication system (VICS), automatic toll collection system called electronic toll collection system (ETC), driving assistant road system called advanced cruise-assist highway system (AHS) and the like. By cooperation of these multiple systems, it is aimed to achieve an initial object of the ITS system.

On the other hand, for recent vehicles, an environment which enables use of various information obtained through the non-ITS system such as telephone, electronic mail, web data, fax data, TV broadcasting content and the like has been gradually arranged.

In such ITS/non-ITS system, if some information arrives at and/or some information is generated in a given vehicle, for example, if parking lot information is received through the VICS system, this parking lot information is communicated to a driver or if telephone call is received through a vehicle mounted telephone, the reception of call is notified to the driver by appealing to organ of sense for seeing or hearing.

In the aforementioned conventional ITS/non-ITS system, for example, currently, the VICS or ETC in each system or various appliances which exert respective functions such as an onboard telephone, an onboard fax and the like take information processing procedure of conveying information which arrives at or is generated in itself directly to the driver without any cooperation with other appliances.

However, the information processing capacity of a driver who is driving a vehicle is limited from physiologic viewpoints. Thus, it has been well known that even if a large amount of information is given to the driver all at once, he cannot process such large information in a short time. If it is intended to convey multiple pieces of information arriving and/or generated under the aforementioned ITS/non-ITS system to the driver at the same time, not only such multiple pieces of information are not conveyed effectively to the driver, but also as a worst case that can be expected, concentration of the driver to driving is obstructed, so that the safety drive of the vehicle is spoiled.

Therefore, development of a new system which enables appropriate information to be used effectively even if multiple pieces of information arrive at and/or are generated at the same time was earnestly desired among related persons.

Particularly, it is estimated that information relating to the ITS system including VICS, ETC, AHS and the like and information relating to the non-ITS system including telephone, electronic mail, web data, fax data, TV broadcasting content, home security information will fall to vehicles in the future like shower. Therefore, under such a condition, how information is effectively used and the safety drive of a vehicle is secured while receiving multiple pieces of information arriving and/or generated at random will be an important problem to be solved.

SUMMARY OF THE INVENTION

The present invention has been achieved in viewpoints of the above described problem and therefore, it is an object of the invention to provide a vehicle information processing method capable of effectively using appropriate information even if multiple pieces of information arrive at/or are generated at the same time, by allocating resources effectively according to priority orders integrally given to the respective pieces of information from viewpoint of the importance, an apparatus therefor and a vehicle therewith.

To achieve the above described object, according to an aspect of the present invention, there is provided a vehicle information processing method for use upon processing of diversified pieces of information including a message arriving at and/or generated in a vehicle, comprising: integrating the diversified pieces of information and providing each of the integrated pieces of information with a priority order indicating an importance of each information; when one or two or more pieces of information arrive at and/or are generated in the vehicle, allocating an appropriate resource selected from the diversified resources for using the generated information to the generated information according to the priority order given to the generated information.

According to the present invention, the diversified pieces of information including a message arriving at and/or generated in a vehicle are integrated and the priority order indicating an importance of each information are given to each of the integrated pieces of the information. That is, for example, various information including information expected to be received in the vehicle such as the VICS data, ETC data, urgency call from home security system (HSS), telephone call and information expected to be generated in the vehicle, such as vehicle velocity data, fuel remainder data, engine rotation speed data, stop lamp lighting data, turn signal lamp data, lighting data of various alarm lamps are integrated so that they can be handles in a unified manner. Then, the priority order is given to each of the integrated pieces of information from viewpoint of the importance. If one or two or more pieces of information arrive at and/or are generated in a vehicle, appropriate resources selected from the diversified resources for using the generated information are allocated to such information according to the priority orders given to the information. The diversified resources for using information mentioned here mean a concept including all resources used for making effective use of given information.

As described above, according to the present invention, appropriate resources for generated information are allocated effectively in the framework of the aforementioned diversified resources and restriction of the priority order integrally given to each information from the viewpoint of the importance. Therefore, even if multiple pieces of information arrive at and/or are simultaneously generated, appropriate information can be expected to be conveyed to a driver effectively. On the other hand, a vehicle information processing method having an excellent expandability applicable to automatic traveling technology which will be achieved in future can be proposed.

In the present invention described above, provision of the priority order indicating the importance of each information is give to each information. Then, it may be meaningful to explain the importance of the information in order to clarify an extension of a scope of the present invention.

From such viewpoint, according to a preferred embodiment of the present invention, the importance of each information is defined so as to include a level of danger introduced from a degree of seriousness of a situation which may occur if the same information is neglected and the priority order indicating the importance of the each information is given to the each information based on the level of danger.

More specifically, according to this embodiment, if alarm information such as "troubled vehicle 1 km ahead" is received from such an obstacle detecting system as the VICS of the ITS system, radar system or the like during a traveling on highway, the highest level of danger is given to this alarm information. Then, this alarm information having the highest level of danger is conveyed to the driver through an appropriate information communicating style such as voice message and/or a stressed alarm display by using appropriate resources such as a voice speaker and/or an image display effectively, thereby improving to the safety drive of the vehicle.

In the aforementioned embodiment, it has been described that the importance of information includes a level of danger. For example, if information having a certain level of danger is generated, providing that information with the priority order considering at what timing the driver should take a reaction is very important in viewpoint of urging the driver to take the reaction at an appropriate timing. Explaining this by exemplifying such an alarm information as the aforementioned message "troubled vehicle 1 km ahead", if the driver, who recognizes this alarm information, mistakes that the troubled vehicle exists just ahead and takes such a reaction as applying the brake suddenly, conversely, there occurs a fear that a collision may occur. Thus, the importance of giving the priority order considering the aforementioned timing may be supported.

In such viewpoint, according to a preferred embodiment of the present invention, the importance of each information is defined so as to include a level of danger and a level of urgency introduced from a length of reaction time required until a driver takes a reaction since he recognizes the each information, and the priority order indicating the importance of the each information is given to the each information based on the level of danger and the level of urgency.

More specifically, according to this embodiment, if such an alarm information as "troubled vehicle 1 km ahead" is received from an obstacle detecting system like the VICS of the ITS system, radar system or the like, the highest level of danger and an intermediate level of urgency are given to this alarm information. Then, an alarm information having a relatively high priority order considering these levels are conveyed effectively to the driver through appropriate information communicating style such as voice message and/or a stressed alarm display by using appropriate resources such as voice speaker and/or an image display effectively so as to urge driver's attention, thereby further contributing to the safety drive of the vehicle.

In the above description, a high level concept like the diversified resources is used to express a using object of information generated in a vehicle abstractly. Then, it is meaningful to express this concept more specifically with a low level concept in order to clarify an extension of the scope of the present invention.

According to a preferred embodiment, there is provided a vehicle information processing method wherein the diversified resources for using the information generated in a vehicle include one or two or more information communicating means prepared for each organ of sense so as to communicate the information to a driver by appealing to a combination of one or two or more organs of sense.

According to this embodiment, the information communicating means is defined as a low level concept of the aforementioned diversified resource. As such an information communicating means, for example, a visual indicator such as a visual display corresponding to sense of sight, acoustic indicator such as a voice speaker corresponding to sense of hearing, a tactile indicator such as a vibrator corresponding to sense of touch and an olfactory indicator such as a smell generator corresponding to sense of smell are employed. Therefore, the information can be conveyed to the driver effectively by appealing to a combination of one or two or more organs of sense.

Further, according to a preferred embodiment of the present invention, the diversified resources for using the information generated in a vehicle include one or two or more information communicating styles corresponding to the characteristic of each information communicating means.

According to this embodiment, on a premise of the previously mentioned embodiment in which the information communicating means is defined as a low level concept of the diversified resources, the diversified resources mentioned here include one or two or more information communicating styles corresponding to the characteristic of each information communicating means. Thus, an appropriate information communicating style is prepared depending on the characteristic of each information communicating means. For example, if the information communication means is a visual indicator, information communication style which uses distinction in statement, image, icon and the like including character, alphanumeric letter and symbol or distinction in attribute including display color, size, blinking, bold letter and the like as parameter is prepared appropriately. If the information communication means is acoustic indicator, information communication style which uses sound volume, sound quality, speed and the like as parameter is prepared. If the information communication means is tactile indicator, information communication style which uses strength of vibration, frequency, frequency of occurrence and the like as parameter is prepared appropriately. As a result, information can be conveyed to the driver effectively using the diversified information communicating style based on the characteristic of each information communicating means.

The above described embodiment refers to the diversified information communicating styles based on the characteristic of each information communicating means. Then, what information communicating style should be taken is a problem in order to convey such information expecting the driver to take some reaction effectively.

In this viewpoint, according to a preferred embodiment of the present invention, the diversified resources for using the information generated in a vehicle include an information communicating style suitable for the driver to grasp a situation.

According to this embodiment, on a premise of the previously described embodiment in which the information communicating means is defined as a low level concept of the diversified resource, the diversified resources mentioned here include information communicating style suitable for the driver to grasp a situation. Therefore, if an alarm information such as “traffic jamming 10 km ahead” is received from the VICS of the ITS system, this alarm information is conveyed to the driver just as it is. A reaction which the driver can take when he recognizes such an alarm information is diversified. For example, some driver may try to drive down from highway to a plain road through a nearby exit to avoid that traffic jamming while other driver may try to take a rest at a nearby service station before entering into the traffic jamming area. The information which gives a driver a room for choice of his reaction can be said to be favorable for a driver who dislikes an aggressive representation of information.

The above embodiment refers to the information communicating style suitable for the driver to grasp a situation. Then, what information communicating style should be taken in order to convey information having a high level of urgency requesting the driver to take a quick reaction is a problem.

In this viewpoint, according to a preferred embodiment, the diversified resources for using the information generated in a vehicle include an information communicating style suitable for the driver to recognize a reaction which he should take.

According to this embodiment, on a premise of the previously described embodiment in which the information communicating means is defined as a low level concept of the diversified resource, the diversified resources mentioned here include information communicating style suitable for the driver to take a reaction. Therefore, if such an alarm information as “troubled vehicle 100 m ahead” is received from the VICS of the ITS system, this alarm information is not conveyed to the driver as it is, however a reaction which should be taken by the driver is indicated and conveyed to the driver just like “hit the brake!”. Here, it has been generally known that man can take a quicker action when he is notified of a responding action which should be subjectively taken than when he is notified of an objective situation. From viewpoints of such human engineering knowledge, information communicating style suitable for the driver to recognize a responding action which he should take can be said to be a favorable style when conveying information having a high level of urgency or for a beginner driver not accustomed to driving.

Meanwhile, in this embodiment, conveying information to the driver using both the information communicating style suitable for the driver to grasp a situation and the information communicating style suitable for the driver to recognize a responding action which he should take belongs to a technical scope of the present invention. Such composite information communicating style is particularly effective under a condition for conveying information for urging the driver to prepare for a responding action. That is, when it is intended to convey such information as “troubled vehicle 1 km ahead. Prepare for avoiding this.”, which should be conveyed to the driver using the composite information communicating style, if only a responding action like “apply the brake” or “decelerate” is indicated as an action which the driver should take, timing for taking such an action is not clear. If the driver applies the brake suddenly at this time, conversely there is generated a fear that a collision may occur. Thus, effectiveness of the composite information communicating style is supported by this fact.

For example, if multiple pieces of messages exist on the visual indicator, the message which indicates a responding action must be only one. This is because the driver cannot take different actions at the same time. For the reason, only a message having the highest priority order indicates a responding action which the driver should take and other messages should indicate only situations.

According to the above described embodiment, a modification of means and style for communicating information is exemplified as a low level concept of the diversified resource. What should be noted when conveying information to the driver selectively using such diversified resource is comparing the attribute of information side including the quantity of information to be conveyed, a content thereof, appropriate communication timing, the aforementioned level of danger, the aforementioned level of urgency and the like with information communicating capacity inherent of each information communicating means including a relation of position of each information communicating means with respect to the driver in a vehicle compartment and get a corresponding matching between the two. An example of mismatch therebetween will be described. For example, if only a tactile indicator having a relatively low information conveying capacity in terms of the quantity is used when conveying a quite large amount of information to the driver or if a visual indicator having a relatively low information conveying capacity in terms of a reaction time of the driver is used when conveying information having a high level of urgency to the driver, such information cannot be conveyed to the driver effectively as evident from the following knowledge obtained from human engineering.

If knowledge obtained from human engineering by the inventor of the present invention is spoken, first of all, it has been known that the quantity of information which can be conveyed per unit time when appealing to man’s organ of sense increases in the order of sense of touch, sense of hearing and sense of sight. From this, it becomes evident that selection of a visual indicator appealing to sense of sight is most favorable when the quantity of information to be conveyed is large. A next important factor is a reaction time required until the driver takes a responding action since he recognizes information. This is known to be substantially longer in the order of sense of touch, sense of hearing and sense of sight. From this, it becomes evident that selection of a tactile indicator appealing to sense of touch is most favorable when the level of urgency of information to be conveyed is high.

In viewpoint of these knowledge, according to a preferred embodiment of the present invention, when communicating the information to the driver using an appropriate resource selected from the diversified resources, a combination of one or two or more appropriate resources is selected from the diversified resources based on a combination of one or two or more of the quantity of information to be communicated, a content thereof, an appropriate communication timing, importance of the information and information communicating capacity inherent of each of the diversified resources, so as to communicate the information to the driver using the selected resources.

According to this embodiment, when conveying information to the driver using appropriate resource selected from the diversified resources, a combination of one or two or more appropriate resources is selected from the diversified resources based on a combination of one or two or more information attributes such as the quantity of information to be conveyed and information communicating capacity inherent of each of the diversified resources and then, information is conveyed to the driver using the selected resources. Here, selection of a combination of one or two or more resources from the diversified resources is concept including an embodiment for conveying information using different resources and an embodiment for conveying information using multiplicity of the same resources. In the former case, for example, there is a case in which information is conveyed using both indicators for sense of sight and sense of hearing. In this case, even if the driver happens to neglect information on the visual indicator, he can know the content of the information through a voice message generated from the acoustic indicator, thereby intensifying certainty of information communication. However, although multiple pieces of information can be displayed on the same screen at the same time, the acoustic indicator is not capable of doing it. Thus, the information communicating capacity inherent of each resource is recognized clearly and appropriate resource for information is selected. In the latter case, for example, if multiple visual indicators are disposed within a vehicle compartment, information having a higher priority order is displayed on a visual indicator disposed at a position easier to see based on information attribute and information communicating capacity inherent of each visual indicator so as to optimize selection of the information communicating means. Further, if information having the highest priority order and a large quantity for communication is generated, many resources are allocated to communication of this information. Thus, for example, indication displayed on a visual indicator up to then and having a lower priority order may be sometimes deleted. In this case, the deleted information is regarded as information generated newly after the information having the highest priority is deleted and conveyed again as required. Meanwhile, if there is a sufficient space for displaying multiple pieces of information on the display screen of the visual indicator, needless to say, the message having the highest priority order is displayed at a position easiest to see.

According to this embodiment, what information should be conveyed to where, how and when can be determined based on the quantity of information to be communicated, information attribute and information communicating capacity inherent of each resource, in other words, selection of information to be conveyed, selection of information communicating means, selection of information communicating style and selection of various parameters such as communicating timing can be optimized.

If referring to a further modification of the above described diversified resources, according to a preferred embodiment of the present invention, the diversified resources for using the information generated in a vehicle include a self-traveling control means having a function for controlling self-traveling of the vehicle based on the same information.

According to this embodiment, the aforementioned diversified resources include a self-traveling control means having a function for controlling the self-traveling of a given vehicle based on the same information. Therefore, a vehicle information processing method having an excellent expandability applicable to automatic traveling technology expected to be achieved in future can be proposed.

Further, according to a preferred embodiment of the present invention, the self-traveling control means has a function for controlling a speed of the vehicle and/or a steering angle thereof based on the information generated in the vehicle so as to aim at the self-traveling of the vehicle.

According to this embodiment, the self-traveling control means has a function for controlling the speed of the vehicle and/or the steering angle based on information generated on the vehicle to aim at the self-traveling of the vehicle. Thus, if an alarm information such as "troubled vehicle 100 m ahead" is received from the VICS of the ITS system, this alarm information is transferred to the self-traveling control means. Consequently, the self-traveling control means becomes capable of taking avoiding action for deceleration and steering wheels. As a result, a vehicle information processing method having an excellent expandability applicable to automatic traveling technology expected to be realized in future can be proposed.

Further, to achieve the above described object of the invention, according to another aspect of the present invention, there is provided a vehicle information processing apparatus having a function for processing diversified pieces of information including a message arriving at and/or generated in a vehicle, comprising: a priority order control means for integrating the diversified pieces of information and providing each of the integrated pieces of information with a priority order indicating an importance of each information so as to control the priority orders; a resource allocation control means for, when one or two or more pieces of information arrive at and/or are generated in the vehicle, allocating an appropriate resource selected from the diversified resources for using the generated information to the generated information according to the priority order given to the generated information.

According to this embodiment, appropriate resources for information generated in a vehicle are allocated in a framework of the aforementioned diversified resources and restriction of the priority order given integrally to respective information from the viewpoint of the importance. Thus, like the aforementioned method corresponding to this aspect, even if multiple pieces of information arrive at and/or are generated at the same time, appropriate information can be expected to be conveyed effectively to the driver and on the other hand, a vehicle information processing apparatus having an excellent expandability applicable to automatic traveling technology expected to be realized in future can be embodied, thereby achieving effective use of appropriate information.

Further, according to a preferred embodiment of the present invention, the importance of each information is defined so as to include a level of danger introduced from a degree of seriousness of a situation which may occur if the same information is neglected, and the priority order control means provides the each information with the priority order indicating the importance of the each information based on the level of danger.

According to this embodiment, if an alarm information such as "troubled vehicle 1 km ahead" is received from the VICS of the ITS system during a traveling on highway, the highest level of danger is given to this alarm information and then, this alarm information having the highest priority order is conveyed effectively to the driver through appropriate information communicating style such as voice message and/or a stressed alarm indication by using appropriate resources such as a voice speaker and/or an image indicator, thereby contributing to the safety drive of the vehicle like the aforementioned method corresponding to this aspect.

Further, according to a preferred embodiment of the present invention, the importance of each information is defined so as to include the level of danger and a level of urgency introduced from a length of reaction time required until a driver takes a reaction since he recognizes the each information and the priority order control means provides the each information with the priority order indicating the importance of the each information based on the level of danger and the level of urgency.

More specifically, according to this embodiment, if alarm information such as "troubled vehicle 1 km ahead" is received from the VICS of the ITS system during a traveling on highway, the highest level of danger and the intermediate level of urgency are given to this alarm information. Then, this alarm information having a relatively high priority order considering these levels is conveyed to the driver through an appropriate information communicating style such as voice message and/or a stressed alarm indication by using appropriate resources such as a voice speaker and/or an image display effectively so as to urge driver's attention, thereby improving to the safety drive of the vehicle.

According to a preferred embodiment of the present invention, the diversified resources for using the information generated in a vehicle include one or two or more information communicating means prepared for each organ of sense so as to communicate information to a driver by appealing to a combination of one or two or more organs of sense.

According to this embodiment, the information communicating means is defined as a low level concept of the aforementioned diversified resource. As such an information communicating means, for example, a visual indicator such as a visual display corresponding to sense of sight, acoustic indicator such as a voice speaker corresponding to sense of hearing, a tactile indicator such as a vibrator corresponding to sense of touch and an olfactory indicator such as a smell generator corresponding to sense of smell are employed. Therefore, like in case of the corresponding method described above, the information can be conveyed to the driver effectively by appealing to a combination of one or two or more organs of sense.

Further, according to a preferred embodiment of the present invention, the diversified resources for using the information generated in a vehicle include one or two or more information communicating styles corresponding to the characteristic of each information communicating means.

According to this embodiment, on a premise of the previously mentioned embodiment in which the information communicating means is defined as a low level concept of the diversified resources, the diversified resources mentioned here include one or two or more information communicating styles corresponding to the characteristic of each information communicating means. Thus, like in case of the corresponding method described above, an appropriate information communicating style is prepared depending on the characteristic of each information communicating means. For example, if the information communication means is a visual indicator, information communication style which uses distinction in statement, image, icon and the like including character, alphanumeric letter and symbol or distinction in attribute including display color, size, blinking, bold letter and the like as parameter is prepared appropriately. If the information communication means is acoustic indicator, information communication style which uses sound volume, sound quality, speed and the like as parameter is prepared. If the information communication means is tactile indicator, information communication style which uses strength of vibration, frequency, frequency of occurrence and the like as parameter is prepared appropriately. As a result, information can be conveyed to the driver effectively using the diversified information communicating style based on the characteristic of each information communicating means.

Further, according to a preferred embodiment of the present invention, the diversified resources for using the information generated in a vehicle include an information communicating style suitable for the driver to grasp a condition.

According to this embodiment, on a premise of the previously described embodiment in which the information communicating means is defined as a low level concept of the diversified resource, the diversified resources mentioned here include information communicating style suitable for the driver to grasp a situation. Therefore, if an alarm information such as "traffic jamming 10 km ahead" is received from the VICS of the ITS system, this alarm information is conveyed to the driver just as it is. A reaction which the driver can take when he recognizes such an alarm information is diversified. For example, some driver may try to drive down from highway to a plain road through a nearby exit to avoid that traffic jamming while other driver may try to take a rest at a nearby service station before entering into the traffic jamming area. The information which gives a driver a room for choice of his reaction can be said to be favorable for a driver who dislikes an aggressive representation of information.

Further, according to a preferred embodiment of the present invention, the diversified resources for using the information generated in a vehicle include an information communicating style suitable for the driver to recognize a reaction which he should take.

According to this embodiment, on a premise of the previously described embodiment in which the information communicating means is defined as a low level concept of the diversified resource, the diversified resources mentioned here include information communicating style suitable for the driver to take a reaction. Therefore, like in case of the corresponding method described above, if such an alarm information as "troubled vehicle 100 m ahead" is received from the VICS of the ITS system, this alarm information is not conveyed to the driver as it is, however a reaction which should be taken by the driver is indicated and conveyed to the driver just like "apply the brake". Here, it has been generally known that man can take a quicker action when he is notified of a responding action which should be subjectively taken than when he is notified of an objective situation. From viewpoints of such human engineering knowledge, information communicating style suitable for the driver to recognize a responding action which he should take can be said to be a favorable style when conveying information having a high level of urgency or for a beginner driver not accustomed to driving.

Further according to a preferred embodiment of the present invention, the resource allocation control means, when allocating appropriate resources for communicating the information which is an objective of communication, selects a combination of one or two or more appropriate resources from the diversified resources, based on a combination of one or two or more of the quantity of information, a content thereof, an appropriate communication timing and importance of the information and information communicating capacity inherent of each of the diversified resources, and the information communicating means selected by the resource allocation control means communicates the information to the driver using the resources selected by the resource allocation control means.

According to this embodiment, like in case of the corresponding method described above, what information should be conveyed to where, how and when can be determined based on the quantity of information to be communicated, information attribute and information communicating capacity inherent of each resource, in other words, selection of information to be conveyed, selection of information communicating means, selection of information communicating style and selection of various parameters such as communicating timing can be optimized.

On the other hand, according to a preferred embodiment of the present invention, the diversified resources for using the information generated in a vehicle include a self-traveling control means having a function for controlling self-traveling of the vehicle based on the same information.

According to this embodiment, the aforementioned diversified resources include a self-traveling control means having a function for controlling the self-traveling of a given vehicle based on the same information. Therefore, like in case of the corresponding method described above, a vehicle information processing apparatus having an excellent expandability applicable to automatic traveling technology expected to be achieved in future can be proposed.

Further, according to a preferred embodiment of the present invention, the self-traveling control means has a function for controlling a speed of the vehicle and/or a steering angle thereof based on information generated in the vehicle so as to aim at the self-traveling of the vehicle.

According to this embodiment, the self-traveling control means has a function for controlling the speed of the vehicle and/or the steering angle based on information generated on the vehicle to aim at the self-traveling of the vehicle. Thus, like in case of the corresponding method described above, if an alarm information such as "troubled vehicle 100 m ahead" is received from the VICS of the ITS system, this alarm information is transferred to the self-traveling control means. Consequently, the self-traveling control means becomes capable of taking avoiding action for deceleration and steering wheels. As a result, a vehicle information processing apparatus having an excellent expandability applicable to automatic traveling technology expected to be realized in future can be proposed.

Further, to achieve the above object, according to still another aspect of the present invention, there is provided a vehicle loaded with the above described vehicle information processing apparatus.

According to the present invention, it is possible to provide a vehicle having a high information processing capacity by achieving effective use of appropriate information even if multiple pieces of information arrive at and/or are generated at the same time.

The nature, principle and utility of the invention will become more apparent from the following detailed description when read in conjunction with the accompanying drawings.

DESCRIPTION OF THE PREFERRED EMBODIMENTS

Hereinafter, the preferred embodiments of the vehicle information processing apparatus, an apparatus therefor and a vehicle therewith according to the present invention will be described in detail with reference to the accompanying drawings.

Figure 1:
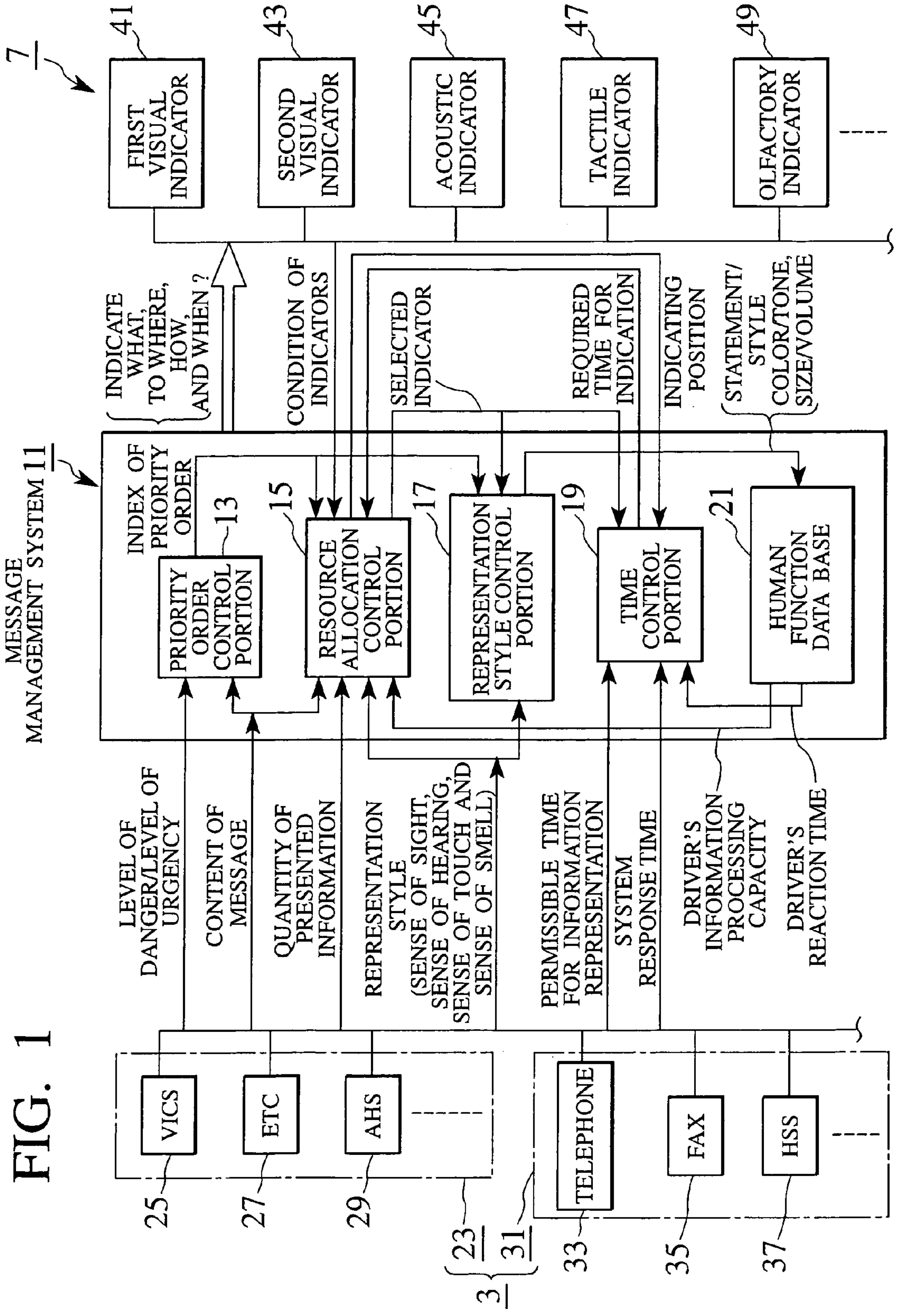
FIG. 1 is a functional block diagram of a vehicle information processing apparatus according to the present invention.

The vehicle information processing apparatus proposed by the present invention includes a message management system (hereinafter referred to as MMS) shown in FIG. 1. If a multiplicity of information arrive and/or are generated at the same time, the MMS 11 optimizes the priority order of various parameters such as selection of information to be transmitted, selection of information communication means, selection of information communication type, communication timing and the like in order to transmit such multiple information to a vehicle driver effectively, as described below. This priority order is given to each of the multiple information integrally. What should be noticed in this optimization is that driver's physiologic information processing capacity and reacting time are considered mutually to each other. If the respective systems transmit information independently without considering the priority order and the like, every information is transmitted as if all of them are equally the most important, so that all messages are indicated by stressing in red light as the most important message. Consequently, the driver consumes a large amount of time until he recognizes truly the important information to take an appropriate reaction to that information. Meanwhile, for information expected to arrive at and/or is generated, according to the present invention, characters, voice, image and a combination thereof are exemplified.

The vehicle information processing apparatus invented based on the above described principle comprises ITS/non-ITS system group 3, MMS 11 and indicator group which functions as an information communication means.

The MMS 11 which take an important role in the vehicle information processing apparatus of the present invention comprises a priority order control portion 13 which functions a priority order control means, resource allocation control portion 15 which functions as resource allocation control means, representation style control portion 17, time control portion 19 and human function data base 21.

The priority order control portion 13 integrates diversified information including a message arriving at and/or generated in a vehicle and provides that integrated information with a priority order indicating an order of importance of each information so as to control the priority order given to various information.

The resource allocation control portion 15 has a function of, if one or two pieces of information arrive at and/or are generated in a vehicle, allocating an appropriate resource from diversified resources using the same information to that information according to the priority order given to the generated information.

The representation style control portion 17 stores diversified representation style, which are information communication styles corresponding to the characteristic of each indicator, the representation style being used when that indicator is allocated as an appropriate indicator from the indicator group 7 including the above described diversified resources. Further, the representation control portion 17 allocates an appropriate representation style corresponding to a priority order possessed by a given information, from the stored diversified representation styles. Here, if the information communication means is a visual indicator, the diversified representation styles include information communication style which uses distinction in statement, image, icon and the like including character, alphanumeric letter and symbol or distinction in attribute including display color, size, blinking, bold letter and the like, as parameter. If the information communication means is acoustic indicator, the diversified representation styles include information communication style which uses sound volume, sound quality, speed and the like as parameter, and if the information communication means is tactile indicator, include information communication style which uses strength of vibration, frequency, frequency of occurrence and the like as parameter.

The human function data base 21 stores driver's physiologic information processing capacity and reaction time corresponding to each of the aforementioned diversified representation styles stored by the representation style control portion 17.

The time control portion 19 controls communication timing and representation continuance time of a given information, based on the type and representation style of an indicator for information communication allocated by the resource allocation control portion 15 and driver's reaction time necessary for the given information, obtained by referring to the human function data base 21.

On the other hand, the aforementioned ITS/non-ITS system group 3 includes ITS system group 23 and non-ITS system group 31. Further, the ITS system group 23 includes various systems related to the ITS system such as VICS 25, ETC 27 and AHS 29. The non-ITS system group 31 includes various systems related to the non-ITS system such as mobile phone 33, vehicle mounted fax 35, response system (HSS) 37 which responds to urgency call from home security system and the like.

Figure 4:
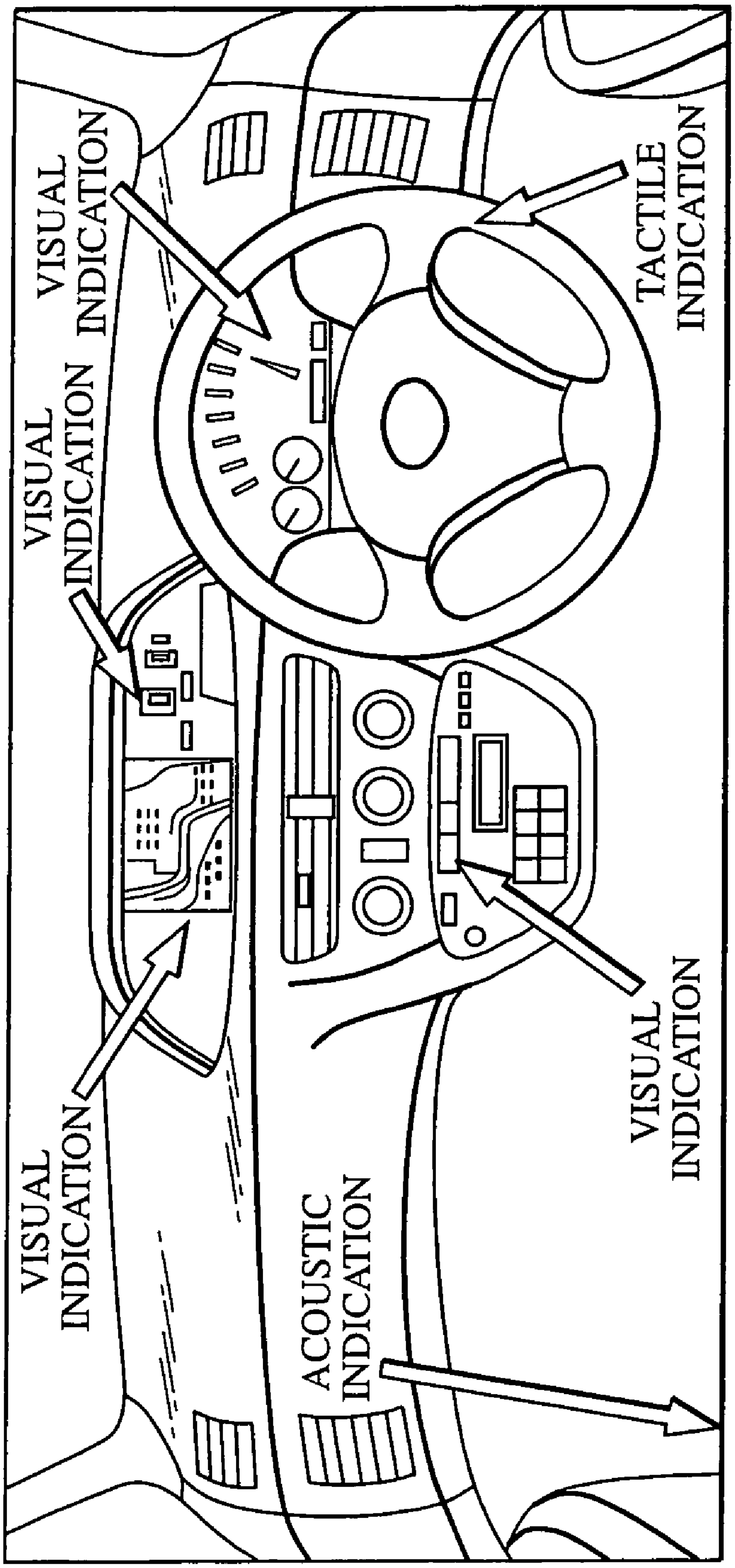
FIG. 4 is a diagram showing an example of disposition of various information communication means in a vehicle.

On the other hand, the aforementioned indicator group 7 includes fist, second visual indicators 41, 43 which are displays appealing visually, acoustic indicator 45 appealing to sense of hearing, such as speaker, tactile indicator 47 appealing to sense of touch such as vibrator provided on a steering wheel or seat and olfactory indicator 49 appealing to sense of smell such as smell generator. These various indicators of the indicator group 7 are disposed at various locations in a vehicle compartment so as to supply various information to the driver, such as an example shown in FIG. 4.

Next, examples of installation of the vehicle 1 information processing apparatus having such a structure will be described with reference to FIGS. 2, 3.

Figure 2:
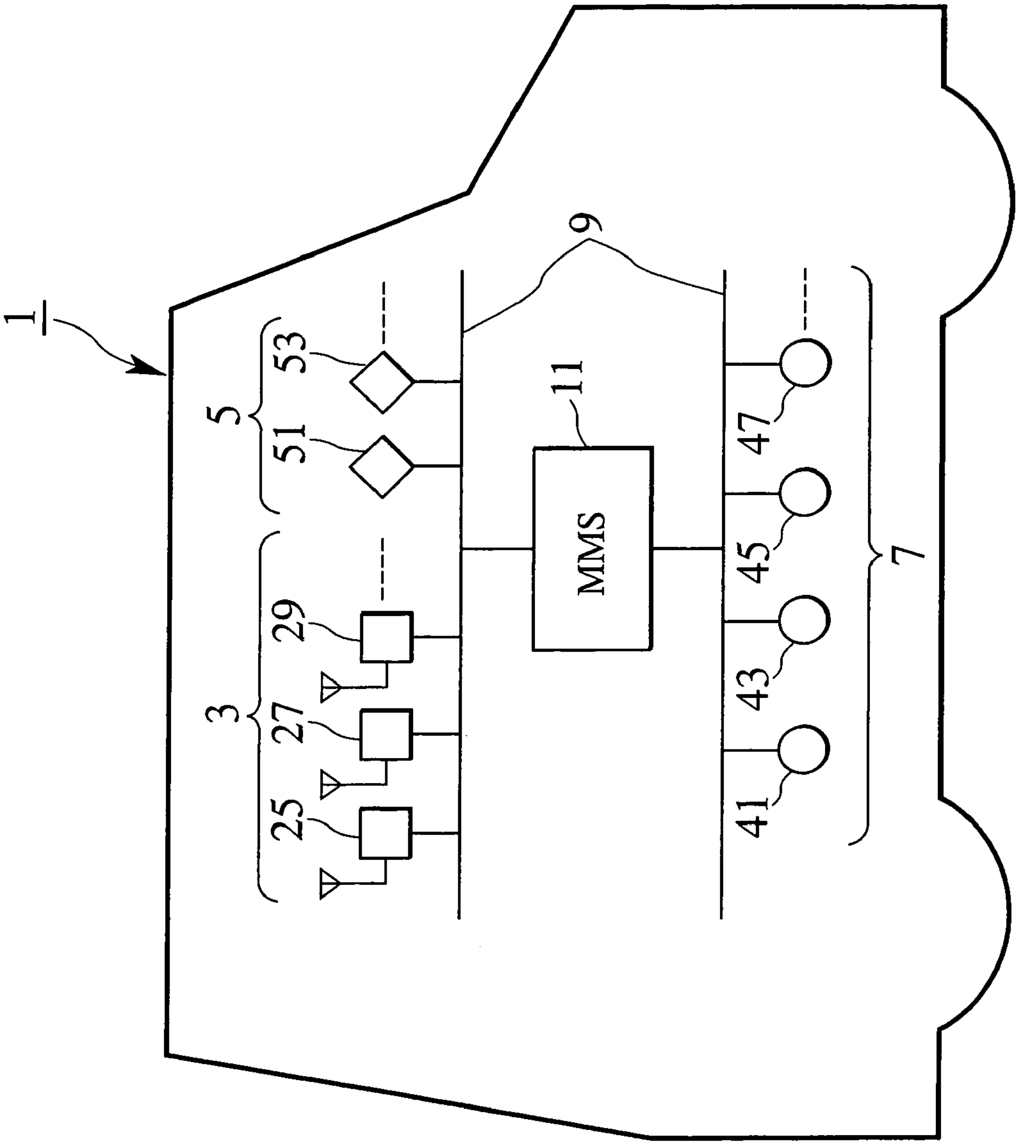
FIG. 2 is a schematic block diagram showing an example of installation of the vehicle information processing apparatus on a vehicle.
Figure 3:
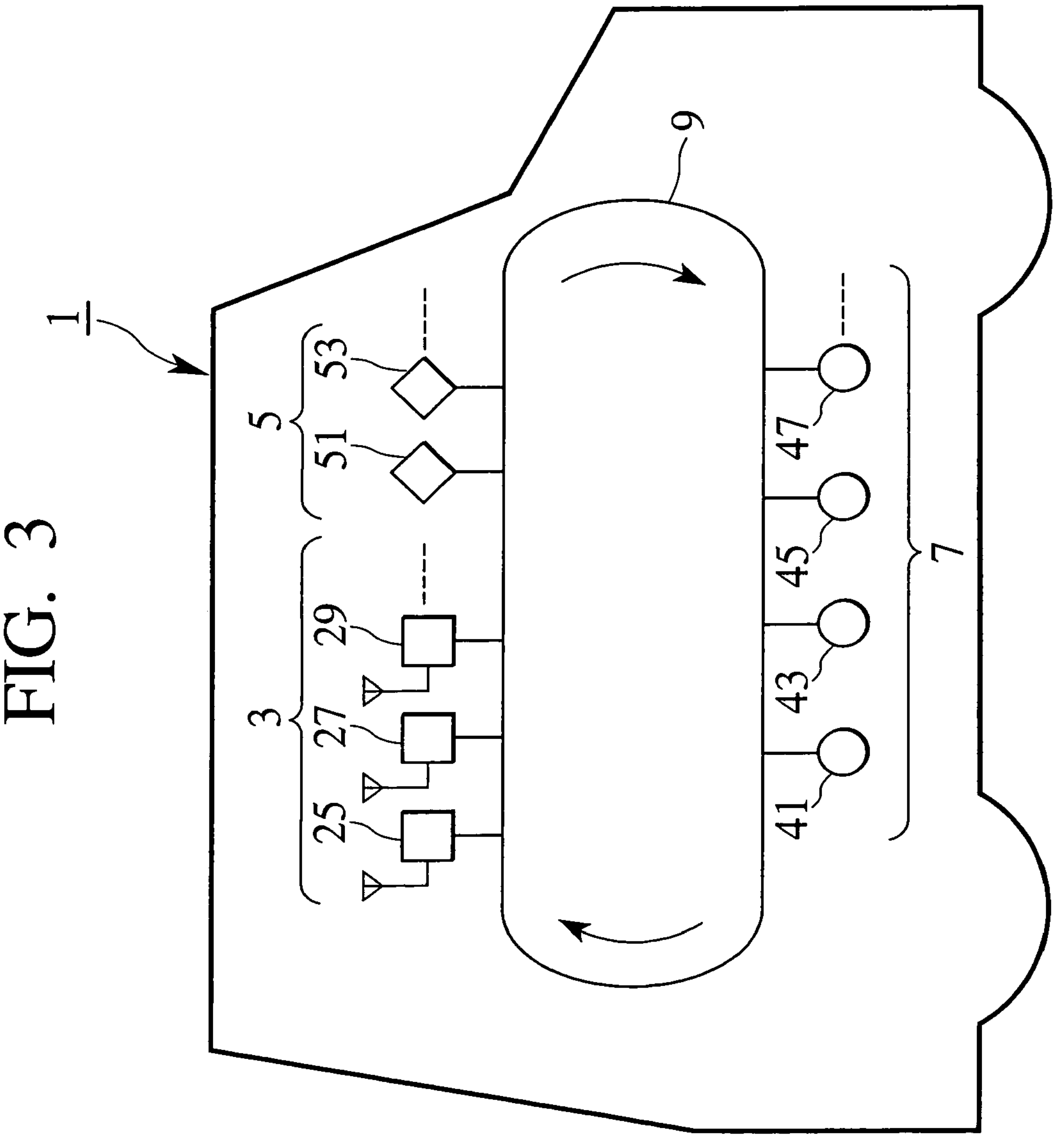
FIG. 3 is a schematic block diagram showing an example of installation of the vehicle information processing apparatus on a vehicle.

The vehicle information processing apparatus according to the installation example shown in FIG. 2 is so constructed that the ITS/non-ITS system group 3, various sensor group 5 for detecting a vehicle condition, indicator group 7 and MMS 11 are connected to each other through a vehicle mounted network 9 so that data can be exchanged from one to another. As a modification of the installation example shown in FIG. 2 of the vehicle information processing apparatus, it is permissible to connect the MMS 11 directly to one or two or more independent information generating sources so that data can be exchanged between the MMS 11 and such an independent information generating source. Further, it is also permissible to construct the vehicle information processing apparatus by combining the installation example shown in FIG. 2 with the aforementioned modification.

The aforementioned sensor group 5 includes, for example, a vehicle velocity sensor 5 for detecting a vehicle velocity, a steering angle sensor 53 for detecting a vehicle steering angle, an obstacle sensor for detecting for an obstacle in a vehicle traveling direction, a vehicle distance sensor for detecting a vehicle distance between an object vehicle and a preceding vehicle, a heart rate sensor for measuring a heart rate of a driver, a brain wave sensor for measuring a brain wave of the driver, a passenger sensor for detecting whether or not a person is seated on a passenger seat and the like. According to this installation example, various sensor group 5 for detecting a vehicle condition is added to respective components of the vehicle information processing apparatus shown in FIG. 1. Consequently, vehicle condition is added as a new parameter when the MMS 11 allocates the resources. As a result, if information that an obstacle exists ahead of a vehicle is received when the vehicle is traveling at a relatively high speed, the priority order of that information is shifted to higher than its original priority order, so that the allocation of the resource can be carried out considering a level of operating load on the driver. Consequently, it is possible to expect a highly practical, effective information communication on which the traveling condition is faithfully reflected to be achieved.

On the other hand, the vehicle information processing apparatus according to an installation example shown in FIG. 3 will be described regarding mainly a difference from the installation example shown in FIG. 2. In this vehicle information processing apparatus, the vehicle mounted network 9 is a ring-shaped topology and particularly, the MMS 11 is incorporated integrally in each of various units or sensors located as a node on the vehicle mounted network 9 or each communication unit located at a joint between the vehicle mounted network 9 and each node. In this case, the respective MMSs 11 provided corresponding to each node achieve the multiple functions of the MMS 11 of the present invention dispersively. Meanwhile, as a modification of the installation example shown in FIG. 3 of the vehicle information processing apparatus, instead of a structure that the MMSs 11 are incorporated in the respective units and sensors or communication units, it is permissible to connect the MMS 11, which achieves a master function by processing information generated in the units and sensors integrally, to the vehicle mounted network 9 from outside. In this case, it is also permissible to connect one or two or more independent information generating sources directly to the MMS 11 without the vehicle mounted network 9 so that data can be exchanged between the MMS 11 and such an independent information generating source.

Next, three functions possessed by the vehicle information processing apparatus having such a structure will be described.

A first function is a function for providing respective pieces of information containing diversified messages with the priority order in an integral viewpoint. The purpose of the first function is to enable selection of information which should be communicated depending on the level of importance of each information when multiple pieces of information simultaneously are generated.

A second function is a function for allocating one or two or more resources in combination from the diversified resources. Upon this allocation of the resources, a combination of one or two or more selected from an amount of information to be communicated, its content, appropriate communication timing and importance which each information possesses are considered.

A third function is a timing control function for communication of information transmission and the communication timing is determined considering a driver's reaction timing and system response time.

Meanwhile, the necessity of the above described first-third functions are introduced from the following principle.

Regarding providing the respective pieces of information containing diversified messages with the priority order according to the first function, it is necessary to define some scales concerning the importance of information in order to provide diversified information containing message arriving at and/or generated in a vehicle as time goes. Here, when multiple pieces of information which should be communicated are simultaneously generated from the ITS/non-ITS system to the MMS 11, the priority order is used for determining which information should be indicated in what indicator, which information should not be indicated and how stressfully that information is indicated. Further, this priority order includes two indices, that is, "level of danger" and "level of urgency".

If the "level of danger" and "level of urgency" for information are defined here, the "level of danger" is a scale for indicating an importance of information communicated to the driver, which is set depending on the level of the worst case which may occur if that information is neglected by a driver.

The "level of urgency" is a scale indicating a degree of urgency of information conveyed to the driver, which is set depending on a length of a reaction time required until the driver takes a reaction to that information.

Meanwhile, when the "level of danger" and "level of urgency" are set up for each information, search using sufficient parameters is carried out and as a result of statistical analysis thereof, the "level of danger" and "level of urgency" for each information are set up.

If speaking of an example of determination of the priority order, five classes shown in following Tables 1, 2 are set up for each of the "level of danger" and "level of urgency". In order to quantify the priority order of each information, the "level of danger" and "level of urgency" are classified into respective levels, which are provided with points "5", "4", "3", "2" and "1".

TABLE 1

Classification for determining the indices of "level of danger" and values thereof

| Possible event | | |
|---|---|---|
| Passenger | Vehicle | Point |
| Possibility of fatal injury | Possibility of full destruction | 5 |
| Possibility of serious injury | Possibility of full destruction | 4 |
| Possibility of slight injury | Possibility of slight damage | 3 |
| No possibility of damage | Possibility of slight damage | 2 |
| No possibility of damage | No possibility of damage | 1 |

TABLE 2

Classification for determining indices of "level of urgency" and values thereof

| Time required until a reaction takes place | Point |
|---|---|
| Quick reaction | 5 |
| Reaction within several seconds | 4 |
| Reaction within a minute | 3 |
| Reaction within several minutes (urges to prepare for reaction) | 2 |
| No reaction (only information indicated) | 1 |

The above described content of each classification, number of set levels and weighing of point of each classification are only an example. The reason is that the indices of the priority order can be imagined to change largely depending on traffic environment and cultural background of each country. In this case, the MMS 11 having an algorithm for calculating the indices of the priority order by comparing diversified information according to a standardized procedure is needed. More specifically, in some case, it may be appropriate to sum up points of "level of danger" and "level of urgency" so as to obtain indices of the priority order (= point in "level of danger"+point in "level of urgency") In some case, it may be appropriate to obtain the priority order indices by increasing the weight of the point in the "level of danger" or alternatively, in some case, it may be appropriate to obtain the priority order indices by increasing the weight of the points in the "level of urgency".

When allocating an appropriate resource to information given to the MMS 11, the quantity of the information, its content, communication timing, "level of danger" and "level of urgency" are referred to. As an initial parameter, the MMS 11 must recognize and grasp the kinds of indicators mounted on a vehicle, quantity of information which each indicator is capable of indicating and each mounting position. Further, when the indicator resource is selected, the MMS 11 must take into consideration a driver's reaction time differing depending on the kind of the indicator, quantity of information and mounting position of the indicator. As other factor which should be considered when the indicator resource is selected, whether or not an indicator which is set up as a candidate indicator already indicates other information must be considered. At that time, the MMS 11 must judge how much information can be added to that indicator. If further information cannot be added to such a candidate indicator, a next indicator must be selected.

The vehicle information processing apparatus of the present invention has the indicator group 7 appealing to different sense organs of the human being. That is, those indicators include the visual indicators 41, 43, acoustic indicator 45, tactile indicator 47, and olfactory indicator 49 (FIG. 1).

A knowledge which an inventor of the present invention and other people have obtained from human engineering will be described. First, it has been known that the quantity of information which can be conveyed per unit time increases in the order of sense of touch, sense of hearing and sense of sight when tactile, acoustic and visual stimulus appeal to human organs of sense. Thus, it comes to be known that it is most favorable to choose a visual indicator appealing to sense of sight when the quantity of information to be conveyed is large. A next important factor is a reaction time required until a driver takes a reactive action after he recognizes such information. It has been well known that the reaction time properly increases in the order of sense of touch, sense of hearing and sense of sight. For the reason, it comes to be known that it is most favorable to choose a tactile indicator appealing to sense of touch when the level of urgency of information to be conveyed is high.

If the visual indicators 41, 43 are used, the MSS 11 must consider the quantity of information, representation style and position of the indicator. If the acoustic indicator 45 is used, the MSS 11 must consider the length of a message. In some case, if a message is conveyed by appealing to different organs of sense at the same time, it may be more effective. For example, if a message is indicated using both indicators for sense of sight and sense of hearing at the same time, the driver is capable of knowing a content of the message by means of acoustic indication without looking at the visual indicator. As a result, the certainty of information communication can be intensified.

Figure 7:
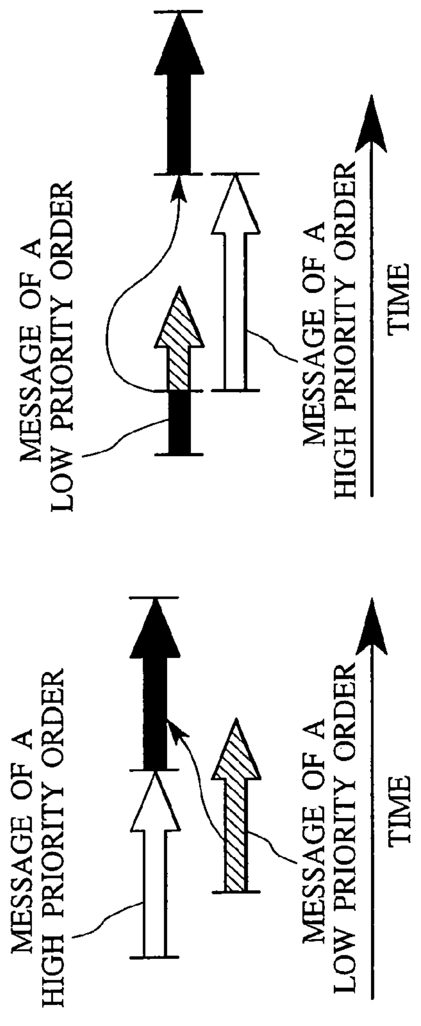
FIG. 7 is a diagram showing an example of handling messages generated at the same time, the message having different priority order.

However, although the visual indicators 41, 43 can display information such as multiple messages on the same screen at the same time, the acoustic indicator 45 cannot do it. Therefore, information communication capacity inherent of each resource is recognized securely and then, an appropriate resource to the information is selected. Further, according to the latter case, for example, if multiple visual indicators are disposed within a vehicle compartment, information having a higher priority order is displayed on a visual indicator installed at a place attracting more attention based on information attribute and information communication capacity inherent of each visual indicator, so that optimization of selection of the information communication means can be achieved. Further, if information having the top priority order and a large quantity is generated as shown in FIG. 7, most resources are allocated to communication of this information with precedence and therefore, information having a lower priority order which was indicated on an indicator up to then maybe sometimes deleted. In this case, after the information having the top priority order vanishes, that deleted information is recognized as information generated newly and represented again as required. Meanwhile, needless to say, if there is a sufficient space for indicating multiple pieces of information on the display screen of a visual indicator, a message having the highest priority order is displayed at a position attracting most attention.

Figures 5A, 5B, 5C, 5D:
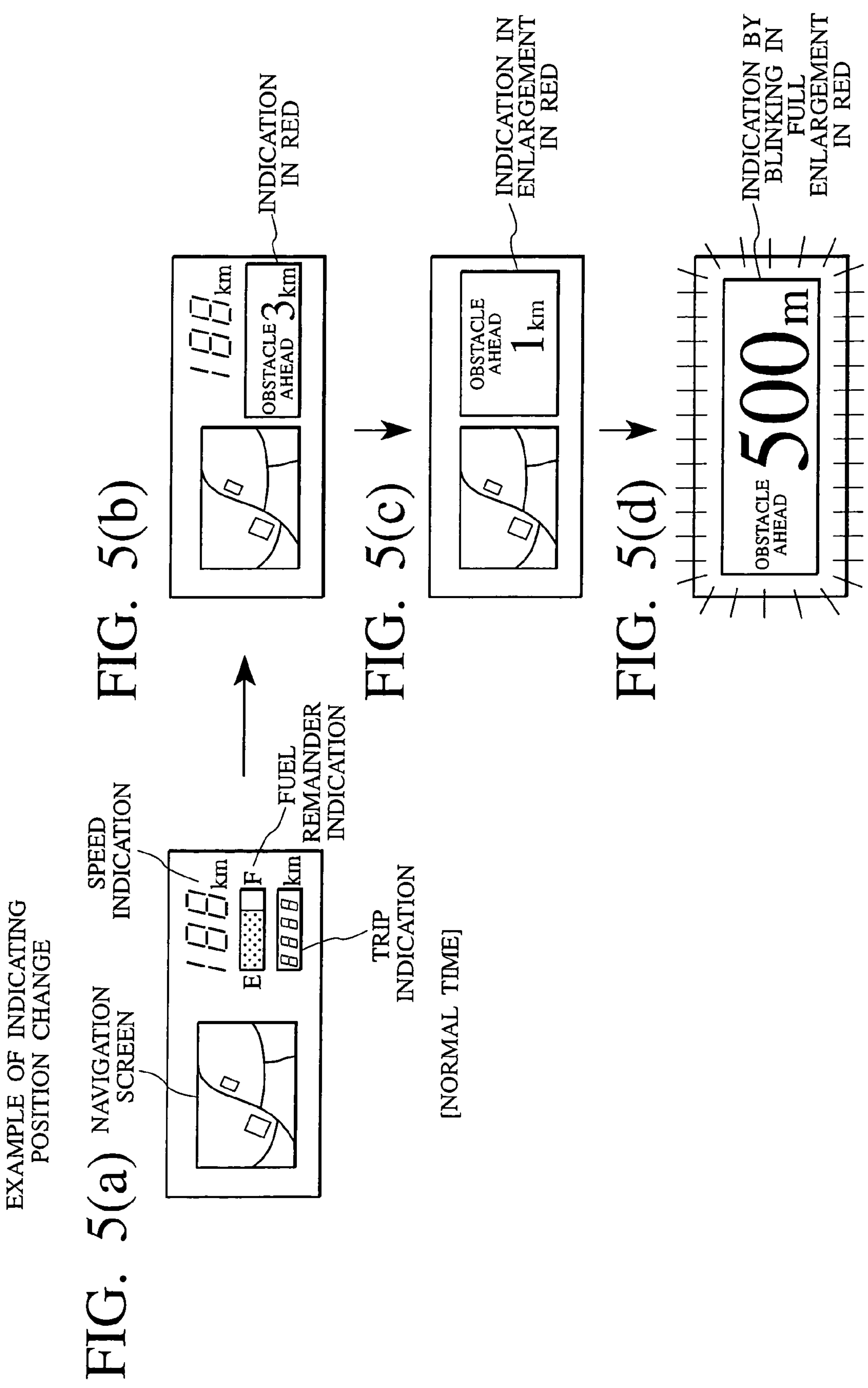
FIG. 5 is a diagram showing an example of visual representation according to various information communication styles.

FIG. 5 shows a visual indication message at normal time before a message is generated and three types of visual indication messages after the message is generated.

Now, assume that as a visual indication message at the normal time, as shown in FIG. 5(*a*), navigation screen, speed, fuel remaining amount and trip are indicated. For example, if an obstacle existing ahead of a vehicle is detected by obstacle alarm system, as shown in FIG. 5(*b*), a message of "obstacle 3 km ahead" is displayed in red at a position where the fuel remaining amount and trip were displayed, instead of these pieces of information. If the vehicle advances with the indication of this message, as shown in FIG. 5(*c*), a message of "obstacle 1 km ahead" is displayed in enlargement in red at a position where the speed and the message of "obstacle 3 km ahead" were displayed, instead of these pieces of information. If the vehicle advances further with the indication of this message, as shown in FIG. 5(*d*), a message of "obstacle 500 m ahead" is displayed in full enlargement by blinking in red at a position where the navigation screen and the message of "obstacle 1 km ahead" were displayed, instead of these pieces of information. As described above, if a symptom which should be communicated to the driver is generated, as the level of danger and/or level of urgency about that symptom arises, a degree of stress of its visual indication image is increased gradually. Consequently, the message can be conveyed to the driver with a stress intensified depending on the degree of the level of danger and/or level of urgency of that symptom.

This kind of reallocation is carried out not only in a common visual indicator, but also can be carried out between indicators appealing to different organs of sense. More specifically, even if a voice instruction is intended to indicate a highway exit as a traveling path guidance, if a message urging to take an action for avoiding an obstacle existing head is generated, the voice instruction for the traveling path guidance is interrupted and instead, a collision alarm message is generated by acoustic indication. However, the traveling path guidance message canceled on the acoustic indicator 45 can be displayed on the visual indicators 41, 43.

Not only the indoor indicator group 7 but also indicators on road should be controlled and managed. Information about road condition such as traffic jam and suspension of traffic is displayed on the road by various methods. Information obtained from the vehicle mounted ITS should match with information sent from the road and consequently, the reliability of the ITS system to the driver can be improved. For the reason, communication between the vehicle mounted system and road installed system is needed.

Next, if speaking of information representation style, when any indicator selected from the indicator group 7 is used to communicate information, the information can be indicated by distinguishing one from another with statement, picture, symbol, color/tone, size/area, icon and the like. To shorten driver's recognition time, a representation style to be applied is preferred to be simplified as much as possible. Not only just a statement or alphanumeric letter is allocated, but also in case of visual indication, its color, size, blinking and the like or in case of acoustic indication, sound volume, sound quality, speed and the like are allocated to each information, and those factors are changed depending on the allocated priority order, so that information can be conveyed more effectively. Meanwhile, in case of tactile indication, the strength of vibration, frequency and frequency of occurrence can be changed.

Because the representation styles for multiple messages are changed depending on each relative priority order ("level of danger" and "level of urgency" are equivalent), those factors should be subjected to control by the MMS 11. If the MMS 11 does not control these factors, all messages are indicated in red as the most important information for each system or all the messages are indicated as if they are all equally the most important.

As a result, the driver takes much time until he recognizes the most important information to which he should take an appropriate reaction.

Further, other control item which the MMS 11 should take for information communication is determining whether a final output style is a representation style suitable for communicating just "condition" or a representation style suitable for urging the driver to take action. For example, this is such a problem like a message in the obstacle alarm system should be "obstacle 1 km ahead" or "prepare for avoiding an obstacle". When a vehicle is approaching an obstacle, either an expression "hit the brake!" or an expression "obstacle 30 m ahead" can be applied. It is generally known that a message which give a direct instruction to the driver enables the driver to take an appropriate action in less time than a message which notifies the driver of a "condition" for the driver to determine which action he should take for himself. Therefore, an action instructing message is preferred to be represented in a more stressed style than a condition transmitting message. Meanwhile, as a message to be dispatched in order to urge the driver to prepare for an action, the above described style indicating only an action should not be taken. The reason is that this style does not indicate a timing for taking an action clearly so that a content to be communicated may become obscure. If multiple messages exist on the visual indicators 41, 43, the message for instructing an action needs to be only one. It is why the driver cannot take different actions at the same time easily. Thus, as a preferred communication style, only a message having a relatively high priority order instructs an action while other message indicates only a just condition.

Figure 6:
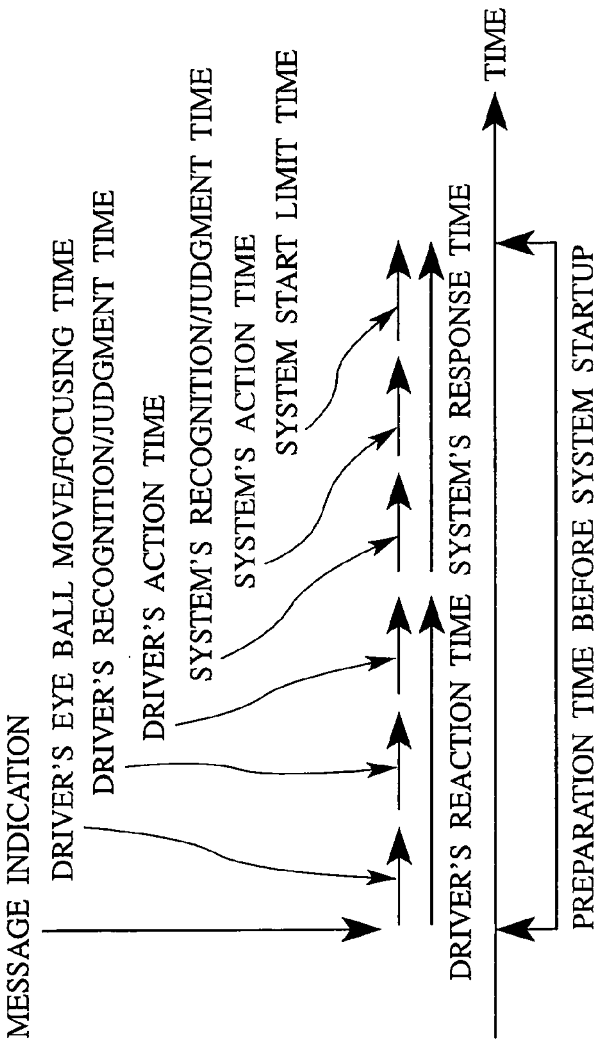
FIG. 6 is a diagram in which a preparation time before system starts corresponding to a generated message is analyzed.

In control on transmission timing of a message from the ITS system, as shown in FIG. 6, the MMS 11 needs to consider total preparation time required until a system which the driver's reaction is applied starts after its representation is started. It has been well known that a time required for man to take an action for looking at the visual indicators 41, 43 depends on the position of the indicator and a time required for man to recognize the content depends on the representation style. Therefore, a message transmission timing should not be determined from one aspect, but should be determined by the MMS 11 by considering an indicating position and representation style totally.

If a message having a higher priority order occupies a display screen, messages having a lower priority order are kept to wait and should be displayed at such a timing that does not occur an interference with this message having the higher priority order (see left side of FIG. 7). On the contrary, if a message having a higher priority order is requested to be displayed during an indication of a message having a lower priority order, the indication up to then is interrupted and then, this message is displayed instead. When the purpose of the message displayed by interrupting the other message is achieved, the MMS 11 determines whether or not the message interrupted having the lower priority order should be restarted again, and if it is determined that the message should be restarted, the MMS 11 handles this message as a new message (see right of FIG. 7).

As other physiologic factor to be considered, when a message is displayed on a display screen of the visual indicators 41, 43, it is necessary to set up a criterion concerning how long a message having a lower priority order should be suspended or whether or not an indication itself thereof is inhibited, not to obstruct a driver's reaction to a message having a higher priority order. Although according to an experiment conducted by the inventor of the present invention and other people, it has been testified that a message which gives a direct instruction for an action enables the driver to take his action in less time than a message which indicates a "condition", this is not always right in any actual driving condition. In an actual driving condition, the driver can take some reactions. Thus, there is a possibility that a reaction which the driver takes actually is different from a reaction expected by a message. As a result, the actual driver's reaction time may be longer than a driver's reaction time expected by the message. As other item to be considered for transmission timing control, there is such a problem that when some message is changed to other message, the human being must switch his information processing process in his brain to other sector. That is, we should grasp a time required to switch over a task in the brain. Additionally, this is also different depending on a similarity between tasks before and after switched over.

As described above, according to the vehicle information processing apparatus of the present invention, for example, if multiple pieces of information arrive at and/or are simultaneously generated in a vehicle, selection of information to be conveyed, selection of information communicating means, selection of information communicating style and selection of parameter such as communication timing are optimized according to the priority order given to each of the multiple pieces of information in order to communicate such multiple information to the driver effectively. As a result, the information can be communicated effectively using an appropriate resource corresponding to the selected parameter by this optimization.

Meanwhile, the above described embodiment is only an example indicated to facilitate understanding of the present invention and is not described to restrict the technical scope of the present invention. Therefore, naturally the present invention includes all embodiments belonging to that technical scope and further includes every equivalents.

More specifically, the diversified resource objective of the present invention is a concept containing all resources used to make effective use of a given information, for example, includes a self-traveling control means having a function for controlling self-traveling of a vehicle based on information generated in the vehicle. Consequently, it is possible to embody a vehicle information processing apparatus having an excellent expandability applicable to automatic traveling technology expected to be realized in future. At this time, the aforementioned self-traveling control means can be so constructed to have a function for controlling a vehicle speed and/or a steering angle based on information generated in the vehicle. As a result, if during a traveling on highway, an alarm message of "troubled vehicle 100 m ahead" is received from the VICS 25 of the ITS system, this alarm information is transferred to the self-traveling control means and the self traveling control means becomes capable of taking an avoiding action such as deceleration and steering operation according to this information. As a result, a vehicle information processing apparatus having an excellent expandability applicable to the self-traveling technology expected to be realized in future can be embodied.

Further, the diversified resource objective of the present invention also includes a generated information recording means such as a drive recorder having a function for recording the content of information generated in a vehicle in succession on time in relation with a time when it is generated. In this case, for example, not only various vehicle information such as vehicle speed and engine rotation speed, but also various information arriving from other system than the given vehicle are recorded in the generated information recording means in relation with the generation time.

Referring again, it should be understood that many modifications and adaptations of the invention will become apparent to those skilled in the art and it is intended to encompass such obvious modifications and changes in the scope of the claims appended hereto.

What is claimed is:

1. A vehicle information processing method for processing diversified pieces of information in a vehicle, including a message comprising at least one of a message arriving at the vehicle and a message generated in a vehicle, comprising:

integrating said diversified pieces of information;

assigning each of the integrated pieces of information with a priority value indicating an importance of each piece of information; and when one or more pieces of information are processed in said vehicle, allocating one or more appropriate resources selected from a plurality of diversified resources to the integrated pieces of information according to an order based upon the priority value assigned to each of the integrated pieces of information and conveying to an operator of the vehicle at least one of such pieces information or a suggested action for the operator to undertake through the one or more appropriate resources, wherein the diversified resources include one or more information communicating means prepared for one or more organs of sense so that the conveying includes communicating each piece of information to the operator by appealing to a combination of one or more organs of sense.

2. A vehicle information processing method according to claim 1 wherein the importance of said each piece of information is defined so as to include a level of danger introduced from a degree of seriousness of a situation which may occur if the same piece of information is neglected and the priority value is assigned to said each piece of information based on said level of danger.

3. A vehicle information processing method according to claim 2 wherein the importance of said each piece of information is further defined so as to include a level of urgency introduced from a length of reaction time required by the operator recognizing each piece of information, and the priority value is assigned to said each piece of information based on said level of danger and said level of urgency.

4. A vehicle information processing method according to claim 1, wherein the diversified resources include one or more information communicating styles corresponding to a characteristic of each information communicating means.

5. A vehicle information processing method according to claim 1, wherein the diversified resources include an information communicating style suitable for the operator to understand a situation.

6. A vehicle information processing method according to claim 1, wherein the diversified resources include an information communicating style suitable for the operator to recognize an intended reaction.

7. A vehicle information processing method according to claim 1, wherein conveying comprises selecting a combination of one or more appropriate resources from said diversified resources based on at least one of the quantity of each piece of information to be communicated, a content of each piece of information, an appropriate communication timing, importance of each piece of information, and an information communicating capacity inherent in each of said diversified resources to communicate each piece of information to the operator using the selected resources.

8. A vehicle information processing method according to claim 1, wherein the diversified resources include a self-traveling control means for controlling self-traveling of said vehicle based on each piece of information.

9. A vehicle information processing method according to claim 8, wherein said self-traveling control means has a function for controlling at least one of a speed of said vehicle and a steering angle thereof based on each piece of information so as to aim at the self-traveling of said vehicle.

10. A vehicle information processing apparatus for processing diversified pieces of information in a vehicle, including a message comprising at least one of a message arriving at the vehicle and a message generated in the vehicle, comprising:

a priority order control means for integrating said diversified pieces of information and assigning each of the integrated pieces of information with a priority value indicating an importance of each piece of information; and a resource allocation control means for, when one or more pieces of information are processed in said vehicle, allocating one or more appropriate resources selected from a plurality of diversified resources to the integrated pieces of information according to an order based upon the priority value assigned to each of the integrated pieces of information and conveying to an operator of the vehicle at least one of such pieces information or a suggested action for the operator to undertake through the one or more appropriate resources, wherein the diversified resources include one or more information communicating means prepared for one or more organs of sense so that the conveying includes communicating each piece of information to the operator by appealing to a combination of one or more organs of sense.

11. A vehicle information processing apparatus according to claim 10 wherein the importance of said each piece of information is defined so as to include a level of danger introduced from a degree of seriousness of a situation which may occur if the same piece of information is neglected, said priority order control means assigning said each piece of information with the priority value based on said level of danger.

12. A vehicle information processing apparatus according to claim 11, wherein the importance of said each piece of information is further defined so as to include a level of urgency introduced from a length of reaction time required by the operator recognizing each piece of information, said priority order control means assigning said each piece of information with the priority value based on said level of danger and said level of urgency.

13. A vehicle information processing apparatus according to claim 10, wherein the diversified resources include one or more information communicating styles corresponding to a characteristic of each information communicating means.

14. A vehicle information processing apparatus according to claim 10, wherein the diversified resources include an information communicating style suitable for the operator to understand a situation.

15. A vehicle information processing apparatus according to claim 10, wherein the diversified resources include an information communicating style suitable for the operator to recognize an intended reaction.

16. A vehicle information processing apparatus according to claim 10, wherein conveying comprises selecting a combination of one or more appropriate resources from said diversified resources based on at least one of the quantity of each piece of information, a content of each piece of information, an appropriate communication timing, importance of each piece of information, and an information communicating capacity inherent in each of said diversified resources and said information communicating means selected by said resource allocation control means communicates each piece of information to the operator using the resources selected by said resource allocation control means.

17. A vehicle information processing apparatus according to claim 10 wherein the diversified resources include a self-traveling control means for controlling self-traveling of said vehicle based on each piece of information.

18. A vehicle information processing apparatus according to claim 17 wherein said self-traveling control means has a function for controlling at least one of a speed of said vehicle and a steering angle thereof based on each piece of information so as to aim at the self-traveling of said vehicle.

19. A vehicle and a vehicle information processing apparatus for processing diversified pieces of information, including a message comprising at least one of a message arriving at the vehicle and a message generated in the vehicle, comprising:

a priority order control means for integrating said diversified pieces of information and assigning each of the integrated pieces of information with a priority value indicating an importance of each piece of information; and a resource allocation control means for, when one or more pieces of information are processed in the vehicle, allocating one or more appropriate resources selected from a plurality of diversified resources to the integrated pieces of information according to an order based upon the priority value assigned to each of the integrated pieces of information and conveying to an operator of the vehicle at least one of such pieces information or a suggested action for the operator to undertake through the one or more appropriate resources;

wherein the diversified resources include one or more information communicating means prepared for one or more organs of sense so that the conveying includes communicating each piece of information to the operator by appealing to a combination of one or more organs of sense.

* * * * *